United States Patent
Neyens et al.

(10) Patent No.: US 9,989,419 B2
(45) Date of Patent: Jun. 5, 2018

(54) IMMERSION DEVICE FOR AN OPTICAL FIBER FOR MEASURING THE TEMPERATURE OF A MELT

(71) Applicant: Heraeus Electro-Nite International N.V., Houthalen (BE)

(72) Inventors: Guido Jacobus Neyens, Opoeteren (BE); Michel Thys, Koersel (BE); Frank Stevens, Hasselt (BE)

(73) Assignee: Heraeus Electro-Nite International N.V., Houthalen (BE)

( * ) Notice: Subject to any disclaimer, the term of this patent is extended or adjusted under 35 U.S.C. 154(b) by 279 days.

(21) Appl. No.: 14/983,819

(22) Filed: Dec. 30, 2015

(65) Prior Publication Data
US 2016/0216160 A1    Jul. 28, 2016

(30) Foreign Application Priority Data
Jan. 28, 2015   (EP) .................................... 15152837

(51) Int. Cl.
| | |
|---|---|
| G01K 1/00 | (2006.01) |
| G01J 5/00 | (2006.01) |
| G01K 13/00 | (2006.01) |
| G01K 1/14 | (2006.01) |
| G01K 11/32 | (2006.01) |
| G01J 5/08 | (2006.01) |
| G01J 5/02 | (2006.01) |
| G01J 5/04 | (2006.01) |

(52) U.S. Cl.
CPC .............. *G01K 1/146* (2013.01); *G01J 5/004* (2013.01); *G01J 5/021* (2013.01); *G01J 5/04* (2013.01); *G01J 5/043* (2013.01); *G01J 5/0821* (2013.01); *G01K 11/32* (2013.01)

(58) Field of Classification Search
USPC .................................. 374/131, 139, 140, 141
See application file for complete search history.

(56) References Cited

U.S. PATENT DOCUMENTS

| | | |
|---|---|---|
| 3,327,531 A | 6/1967 | Fradeneck |
| 3,390,578 A | 7/1968 | Moore |
| 3,650,414 A | 3/1972 | Asada et al. |

(Continued)

FOREIGN PATENT DOCUMENTS

| | | |
|---|---|---|
| CN | 103373585 A | 10/2013 |
| EP | 0009585 A1 | 4/1980 |

(Continued)

OTHER PUBLICATIONS

Extended European Search Report dated Jul. 20, 2015 in EP Application No. 15152837.9.
Office Action dated Aug. 15, 2017 in CN Application No. 201610040456.X.
English translation of Office Action dated Oct. 25, 2016 in JP Application No. 2016-013599.
Office Action dated Dec. 28, 2016 in CA Application No. 2913347.
Office Action dated Mar. 22, 2017 in KR Application No. 10-2006-0005407.

*Primary Examiner* — Mirellys Jagan
(74) *Attorney, Agent, or Firm* — Panitch Schwarze Belisario & Nadel LLP (57) ABSTRACT

An immersion device for disposable guiding tubes of a robotic immersion device includes a stack for the disposable guiding tubes, a feeding channel for feeding an optical fiber into the disposable guiding tube and for feeding the disposable guiding tube together with the optical fiber into a melt, and a transfer mechanism for transferring one disposable guiding tube from the stack into the channel.

17 Claims, 5 Drawing Sheets

(56) References Cited

U.S. PATENT DOCUMENTS

| | | | | |
|---|---|---|---|---|
| 4,239,189 A * | 12/1980 | Scherff | ............... | C21C 5/30 |
| | | | | 221/270 |
| 5,585,914 A * | 12/1996 | Yamasaki | ............... | G01J 5/02 |
| | | | | 356/44 |
| 5,733,043 A * | 3/1998 | Yamada | ............... | G01J 5/041 |
| | | | | 266/99 |
| 5,931,630 A | 8/1999 | Tsai | | |
| 6,004,031 A * | 12/1999 | Takayama | ............... | G01K 1/125 |
| | | | | 266/99 |
| 6,964,516 B2 * | 11/2005 | Coleman, Jr. | ............... | G01J 5/0044 |
| | | | | 266/99 |
| 7,384,192 B2 * | 6/2008 | Dams | ............... | G01J 5/0044 |
| | | | | 374/139 |
| 2014/0321504 A1 | 10/2014 | Neyens et al. | | |

FOREIGN PATENT DOCUMENTS

| | | |
|---|---|---|
| EP | 2799824 A1 | 11/2014 |
| GB | 1091510 A | 11/1967 |
| JP | 4515914 | 6/1970 |
| JP | S52-119974 U | 9/1977 |
| JP | 2014219395 A | 11/2014 |
| KR | 100815450 B1 | 3/2008 |
| KR | 20140130075 A | 11/2014 |

\* cited by examiner

IMMERSION DEVICE FOR AN OPTICAL FIBER FOR MEASURING THE TEMPERATURE OF A MELT

BACKGROUND OF THE INVENTION

The present invention relates to an immersion device for measuring the temperature of a metal with an optical fiber in a metallurgical vessel.

An immersion device for measuring the temperature of a metal with an optical fiber in a metallurgical vessel is known from EP 2 799 824 A1. More particularly, EP 2 799 824 A1 discloses a robotic immersion device for measuring the temperature in a metallurgical vessel using a molten metal-immersed consumable optical fiber and immersion equipment capable of inserting a temperature device through a side wall of an EAF to a predictable molten steel immersion depth with a temperature-to-temperature measuring frequency of less than 20 seconds. The robotic immersion device comprises a disposable guiding tube having an immersion end and a second end, opposite to the immersion end. An optical fiber can be partially arranged in the disposable guiding tube, whereby the inner diameter of the disposable guiding tube is larger than the outer diameter of the optical fiber which is, as a rule, metal coated. An elastic plug is arranged at the second end of or within the disposable guiding tube, whereby the optical fiber is fed through the elastic plug and whereby the elastic plug reduces a gap between the optical fiber and the disposable guiding tube. In a first phase, the optical fiber and the immersion end of the disposable guiding tube are immersed into the melt. In a subsequent second phase, the optical fiber is immersed with higher speed and deeper into the melt than the disposable guiding tube for measuring the temperature of the melt. In a subsequent third phase, the optical fiber is withdrawn from the melt and the disposable guiding tube is ejected into the melt. For a further temperature measurement, it is necessary to provide a further disposable guiding tube.

EP 2 799 824 A1 teaches to attach the robotic immersion device to an access panel of a side wall of the furnace. In this environment, the conditions are harsh due to high temperatures. Scrap may fall down and there is, as a rule, very little room to install an immersion device.

A system for making a series of temperature measurements of a molten bath in a container wherein a plurality of expendable temperature-sensing units are adapted to be sequentially introduced into the container for making subsequent temperature measurements is known from U.S. Pat. No. 3,390,578. The system comprises a magazine for a supply of expendable thermocouple units.

It is an objective of the present invention to provide a more appropriate immersion device for measuring the temperature with an optical fiber in a metallurgical vessel.

BRIEF SUMMARY OF THE INVENTION

An immersion device according to the present invention comprises a stack respectively a magazine for disposable guiding tubes, a feeding channel for feeding an optical fiber into a disposable guiding tube and for feeding the disposable guiding tube together with the optical fiber into a melt and a transfer mechanism for transferring the guiding tubes from the stack into the feeding channel one by one.

In a first step, the transfer mechanism transfers one disposable guiding tube from the stack into the feeding channel. In a subsequent second step, an optical fiber is fed in this disposable guiding tube through an end of the guiding tube which is opposite to the immersion end. In a subsequent third step, the immersion end of the disposable guiding tube comprising an end section of the optical fiber is immersed into the melt. In a subsequent fourth step, the end section of the optical fiber is immersed into the melt for measuring the temperature. In a subsequent fifth step, the optical fiber is withdrawn from the melt and the disposable guiding tube is ejected into the melt. Afterwards, the immersion device is ready for a next temperature measurement according to steps 1 to 5.

Since the transfer mechanism can transfer the disposable guiding tubes one by one from the stack into the feeding channel, guiding tubes in the stack are separated from a guiding tube in the feeding channel. For this reason, the guiding tubes in the stack cannot impede a guiding tube in the feeding channel. A lot of temperature measurements are possible without the need to enter the region adjacent to the furnace.

In a preferred embodiment, the immersion device comprises control means which can manage the steps 1 to 5. In this embodiment, it is possible to carry out a temperature measurement automatically.

In a preferred embodiment, the transfer mechanism separates a guiding tube in the feeding channel from the guiding tubes in the stack by a gap, so that the guiding tubes of the stack cannot disturb the guiding tube in the feeding channel. Preferably, the gap is produced without lifting the guiding tubes in the stack in order to avoid clamping effects in the stack.

In a preferred embodiment, the stack is arranged above the feeding channel so that a guiding tube can fall into the channel due to gravity. As a result, a transfer from the stack into the channel is possible in an easy, technical simple and reliable manner.

In a preferred embodiment, the transfer mechanism comprises at least one relocatable separation element, preferably a plurality of relocatable separation elements, which can separate a disposable guiding tube in the channel from the movable guiding tubes of the stack. The at least one separation element can be shifted between a closed position and an open position. In the open position, a guiding tube can pass the at least one separation element so that a transfer from the stack to the feeding channel is possible. In other words, the one or more separation elements can be shifted from the closed position and can be shifted into the closed position in which the one or more separation elements can separate a disposable guiding tube of the channel from the movable guiding tubes of the stack. One separation element can be composed of one or more parts.

In order to transfer a guiding tube from the stack into the feeding channel, the one or more separation elements will be shifted from the closed position into the open position. A guiding tube will then fall from the stack into the area of the feeding channel. Afterwards, the one or more separation elements will be shifted back into the closed position. In this way, a transfer of a guiding tube from the stack into the feeding channel or at least into the area of the feeding channel will take place.

In a preferred embodiment, the one or more separation elements can be shifted from the closed position and can be shifted into the closed position by a turning movement. The rotation of the one or more separation elements can then take place in a technical simple and fast manner. As explained below, this embodiment may, in addition, contribute to the fixation of bars of the feeding channel in a simple technical manner.

In a preferred embodiment, each axis of each separation element comprises a non-circular cross section which can be inserted into a corresponding non-circular opening, preferably a non-circular opening of a separation element in order to attach each separation element at the immersion device. In a preferred embodiment, the one or more separation elements are attached to the immersion device by a frictional connection and/or by a form closure, specifically a form fit connection. Both embodiments come with the advantage that each separation element may be removed from the immersion device without tools in a fast and simple manner. If the one or more separation elements fix one or more bars of the feeding channel, the one or more bars of the feeding channel may also be removed from the immersion device without tools and may be fixed to the immersion device, especially to a body of the immersion device without tools.

In a preferred embodiment, the diameter of the feeding channel, specifically a first area of the feeding channel, as well as the distance between the ground of the feeding channel, specifically the ground of the first area, and the one or more separation elements is such that only one guiding tube can enter the feeding channel, specifically the first area of the feeding channel. As a result, there is a simple technical and reliable solution in order to transfer only one guiding tube from the stack into the feeding channel.

In a preferred embodiment of the invention, the first area is a first compartment formed from two quadrant-like clearances in opposite side walls of two bars. Preferably, each bar comprises, in addition, a semicircle or nearly semicircle clearance below each quadrant-like clearance. The radius of each semicircle or nearly semicircle clearance corresponds with the radius of the guiding tube. The two semicircle or nearly semicircle clearances form the feeding channel. The first compartment can provide a gap between a guiding tube in the feeding channel and the guiding tubes in the stack without lifting the guiding tubes in the stack. The gap contributes to such a separation of the guiding tube in the feeding channel from the guiding tubes in the stack that the guiding tubes in the stack cannot disturb the guiding tube in the feeding channel. A bar can be of any shape. For example, the cross-section of a bar may be rounded and/or flattened. A rectangular or square cross-section is also possible.

Preferably, the one or more separation elements comprise a wedge-shaped edge which can separate a disposable guiding tube of the channel from the movable guiding tubes of the stack. The wedge-shaped edge is preferably an outer edge of a wing. The separation can take place in a very reliable manner.

As an additional result, the movement of the one or more separation elements into the closed position can lift the guiding tubes in the stack for producing a gap in a further embodiment of the invention. However, this embodiment is less preferred due to clamping problems.

In a preferred embodiment, the feeding channel is provided by two bars whereby preferably at least one of the bars, more preferably both bars are movable between a feeding position and a non-feeding opened position. In the feeding position, there is a frictional connection between a guiding tube in the feeding channel and one or more motor driven wheels, preferably one or more motor driven cogwheels. In the opened position, there is no frictional connection between a guiding tube in the feeding channel and one or more motor driven wheels respectively cogwheels. Due to the frictional connection, the immersion device can immerse the guiding tube into a melt.

In a preferred embodiment, the movement of one or two bars contributes to the formation of a gap between the guiding tubes in the stack and the guiding tube in the feeding channel for the above mentioned reasons without lifting the guiding tubes in the stack.

In a preferred embodiment, the feeding channel comprises pressing means, specifically pushing means, preferably in the form of one or more rotatable disks and/or one or more rotatable wheels. Additionally or as an alternative, the one or more wheels or disks can guide a guiding tube within the channel. In a preferred embodiment, the one or more disks or wheels comprise a wedge-shaped or rounded border. If the rotatable disks or wheels shall guide a guiding tube, the rounded border is adapted to the shape of the guiding tube.

The pressing (specifically pushing) means can press or push a guiding tube against one or more motor driven wheels, like cogwheels, for providing a frictional connection between a guiding tube and a motor driven wheel. At least the border of such a disk or wheel is preferably wedge-shaped or rounded, in order to guide a guiding tube within the channel and/or to push a guiding tube against one or more motor driven wheels.

The one or more rotatable disks and/or one or more rotatable wheels are preferably displaceable between a guiding and/or pressing position and a non-guiding and/or a non-pressing position. In the non-guiding position, the one or more wheels or disks cannot guide a guiding tube in the feeding channel. In the guiding position, the one or more wheels or disks can guide a guiding tube in the feeding channel. In the non-pressing position, the one or more wheels or disks cannot press or push a guiding tube against one or more motor driven wheels, like cogwheels. In the pressing position, the one or more wheels or disks can press or push a guiding tube against one or more motor driven wheels, like cogwheels. Preferably, the displacement of the one or more disks and/or wheels into the guiding and/or pressing position produces a gap between a guiding tube within the channel and the guiding tubes in the stack for the above-mentioned reason.

In order to provide a technical simple solution, one or more of the disks and/or wheels are preferably attached at one or more bars of the feeding channel. If a corresponding bar is movable, the attached one or more disks, specifically wheels, are displaced together with the bar. As a result, a movement of a single bar is sufficient in order to move a plurality of wheels and/or disks in a desired position at the same time in a quick and reliable manner. As an alternative, the bar may comprise a mechanism in order to move all attached displaceable disks and/or wheels in a desired position at the same time. The displaceable disks and/or wheels are preferably spring-loaded in order to hold the wheels and/or disks in a starting position and/or to move the wheels and/or disks into the starting position. Preferably, the starting position is the non-pressing position, specifically the non-guiding position. All of these embodiments contribute to a desired handling of a guiding tube in a feeding channel for measuring the temperature in a technical simple, quick and reliable manner.

In a preferred embodiment, the bars of the feeding channel are attached to a body of the immersion device by a frictional connection and/or due by a form closure. A protrusion of the body may reach into an opening of a bar for a frictional connection. This contributes to the possibility to assemble and to disassemble the immersion device in a simple and quick manner without the need for tools in places where space is limited.

In a preferred embodiment, the body covers electrical equipment of the immersion device and/or, at least in part, one or more motor driven wheels and/or one or more motors. As a result, the sensitive equipment of the immersion device is well protected.

In a preferred embodiment, the body is composed of more, than one section, specifically housings, whereby at least two sections, specifically housings, are connected by a form closure preferably comprising a hook connection. In addition, a rod or a button may be fed through overlapping parts of the housings in order to provide a form fit connection. This contributes to the possibility to assemble and to disassemble the immersion device in a simple and quick manner without the need for tools in places where space is limited.

Preferably, the housing which can be mounted on a panel of the furnace is smaller than the other housings of the body in order to facilitate the installation of the first part of the immersion device, which is most dangerous due to the harsh environment conditions nearby a furnace.

In a preferred embodiment, the feeding channel and the stack are inclined in the working position when the immersion device is attached to a furnace in order to immerse a guiding tube into a melt in an appropriate manner.

In a preferred embodiment, the stack is attached by gravity and/or due to a hook-like or U-shaped connection and/or due to form closure. This contributes to the possibility to assemble and to disassemble the immersion device in a simple and quick manner without the need for tools in places where space is limited.

In a preferred embodiment, at least the lower end wall of the stack, preferably both end walls of the stack, form an acute angle with the feeding channel so that the one, and more particularly both end walls, extend in a perpendicular direction or at least in an almost perpendicular direction in the working position. This avoids a jamming of guiding tube within the stack.

In a preferred embodiment, the lateral borders of the stack comprise a plurality of openings. As a result, falling scrap pieces cannot remain in the stack and disturb the operating of the immersion device.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1:
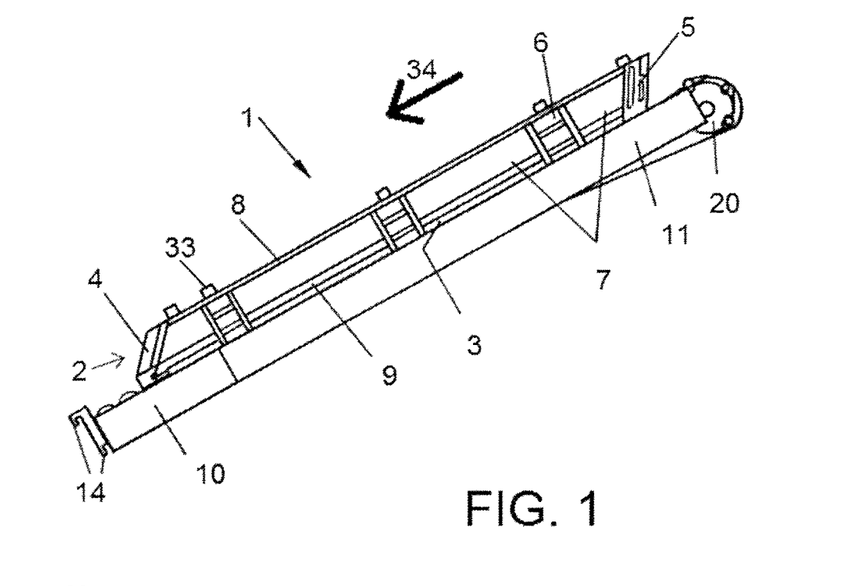
FIG. 1 is a side view of the immersion device according to an embodiment of the present invention.

FIG. 1 shows an immersion device 1 for disposable guiding tubes of a robotic immersion device. The immersion device comprises a stack 2 for the disposable guiding tubes, as known from EP 2 799 824 A1. Two movable bars 3 define a feeding channel area for feeding an optical fiber into a disposable guiding tube and for feeding the disposable guiding tube together with the optical fiber into a melt. The bars 3 extend in a downhill direction in order facilitate the feeding of a guiding tube into a melt when the immersion device is connected to an access panel of a furnace, as known from EP 2 799 824 A1. The stack 2 is arranged above the bars 3 of the feeding channel so that a movable guiding tube can fall from the stack into the feeding channel.

The stack 2 comprises a lower end wall 4 and an upper end wall 5. Both end walls 4, 5 of the stack 2 form an acute angle with the bars 3 of the feeding channel, so that both end walls 4 and 5 extend in a perpendicular direction in the working position of the immersion device 1. The extension in the perpendicular direction facilitates the transfer of the guiding tubes from the stack 2 into the feeding channel 3. Binding effects within the stack 2 are avoided. The stack 2 comprises lateral boundaries for the guiding tubes, namely three small rectangular plates 6 so that there remains a large distance 7 between the rectangular plates 6, as well as between a rectangular plate 6 and an adjacent end wall 4, 5. Due to the large distances 7 and corresponding openings, small external metal pieces which may remain within the stack and block the access into the feeding channel are avoided. Thus, the lower end wall 4, as well as the rectangular plates 6, may hold a plurality of guiding tubes within the stack 2, but not undesirable small external scrap or other metal pieces which may fall down in the environment of a furnace.

The preferably rectangular plates 6 and the end walls 4 and 5 are connected by an upper rod 8 and a lower rod 9. As a result, all parts of the stack 2 are fixed together so that the stack can be handled independent from the further components of the immersion device 1. It is possible to detach the stack 2 from the further components without tools due to a form fit connection in connection with gravity.

The immersion device 1 further comprises a body which is composed of two housings 10 and 11. The body, specifically the housings 10 and 11, cover the electrical equipment of the immersion device. The two housings 10 and 11 are connected by a form fit connection, so that it is possible to separate the lower housing 10 from the upper housing 11 without tools. The two bars 3 are connected to the body by a form fit and/or a frictional connection, so that it is possible to detach the bars from the body 10, 11 without tools.

As a result, the immersion device 1 may be dismantled into individual parts in a very quick and easy manner. On the other hand, it is possible to assemble the individual parts in a quick and easy manner, especially in places where space is limited. For this reason, the immersion device can be installed easily. A lot of space is not necessary for the installation. Thus, the corresponding handling is very convenient.

The (in the working position, lower) housing 10 is much smaller than the (upper) housing 11. For this reason, it is possible to attach the lower housing 10 in a fast and easy manner at an access panel of a furnace. This is of importance since the access panel and the environment of the access panel may be very hot and dangerous. After the installation of the smaller housing 10, it is possible to connect the larger housing 11 to the smaller housing 10 which is not hot and which provides a distance between the access panel and the mounting position for the larger housing 11. For this reason, it is less dangerous to mount the larger panel.

Figure 2:
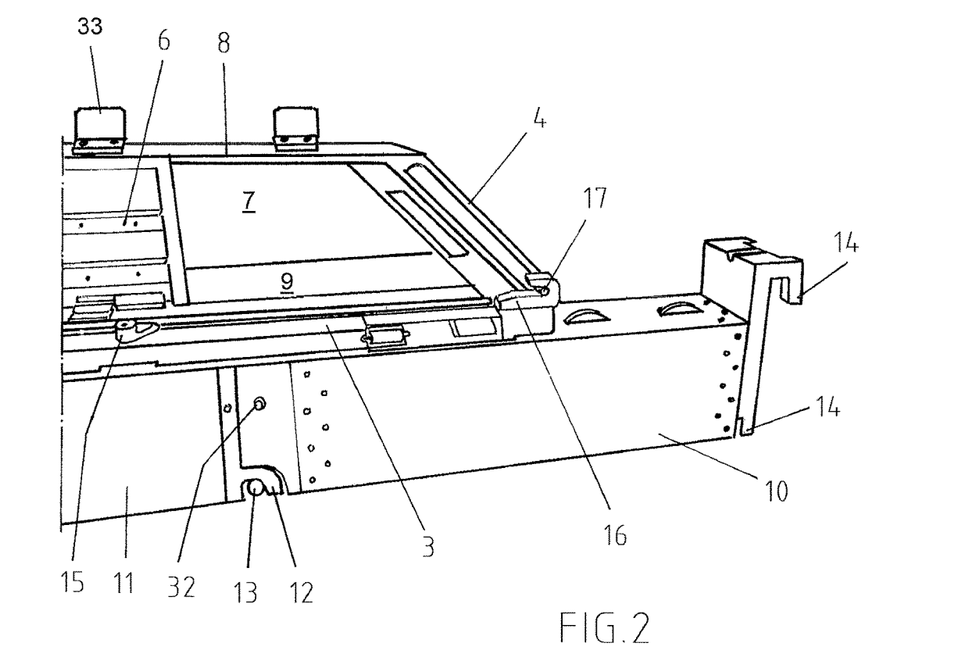
FIG. 2 is a side view of a section of the immersion device according to an embodiment of the present invention.

FIG. 2 shows further details of the immersion device. The form closure connection, particularly the form fit connection, between the two housings 10 and 11 comprises two hooks 12 and two bolts 13. It is possible to attach the hooks 12 of the larger housing 11 to the bolts 13 of the smaller housing 10 as shown in FIG. 2. In addition, a rod 32 may be fed through overlapping walls of the two housings 10 and 11 in order to provide a form fit connection between the two housings 10 and 11.

The other end of the smaller housing 10 comprises at least two hooks 14, preferably four hooks 14, in order to hook the housing 10 into corresponding rods of a furnace access panel and to attach the housing 10 to the access panel in an extremely simple and fast manner.

Separation elements 15 are rotatably connected to the larger housing 11. The housing 11 covers one or more motor drives for the separation elements 15. The axis of a separation element 15 feeds through a bar 3 of the feeding channel.

The smaller housing 10 comprises two U-shaped connection elements 16. Two corresponding bolts 17 of the end wall 4 of the stack are inserted into the U-shaped connection elements 16.

Figure 3:
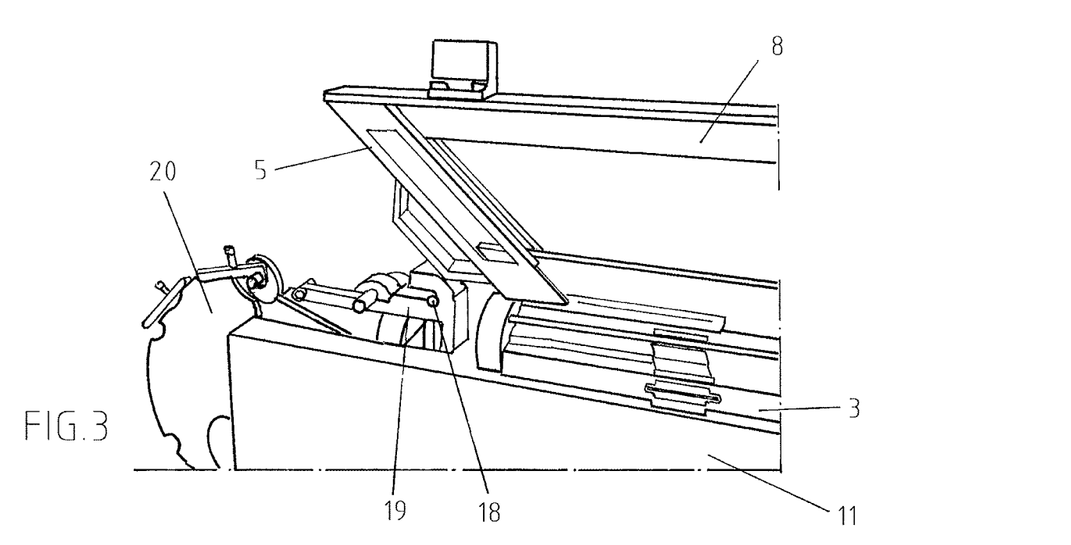
FIG. 3 is a side view of a further section of the immersion device according to an embodiment of the present invention.

FIG. 3 is a side view of a further section of the immersion device 1. The larger housing 11 also comprises two U-shaped connection elements 19 which are hooked into two corresponding bolts 18 of the end wall 5 of the stack. In the working position, the openings of all U-shaped connection elements 16 and 19 are above the ground of the U-shaped connection elements 16 and 19 when the immersion device is connected to a furnace. Due to gravity, the inserted bolts 17 and 18 of the stack remain within the U-shaped connection elements 16 and 19.

The larger housing 11 comprises a feeding mechanism 20 for a metal coated optical fiber.

Figure 4:
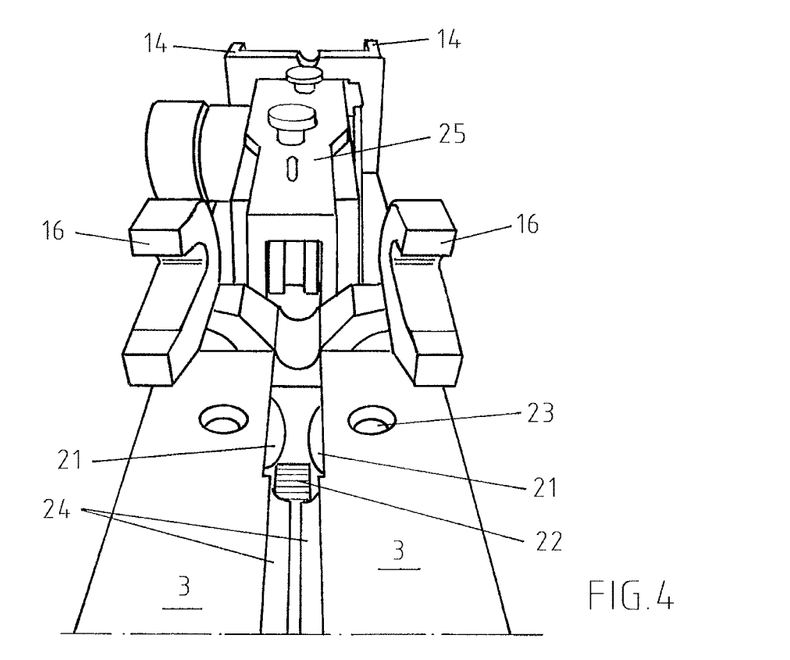
FIG. 4 is a top view of a section of the feeding channel of the immersion device according to an embodiment of the present invention.

FIG. 4 is a top view of a section of the feeding channel area of the immersion device. Each bar 3 comprises a disk 21 above a motor driven cogwheel 22. Each disk 21 is rotatably mounted by an axis 23. The rotatably mounted motor driven cogwheel 22 is attached to the body of the immersion device. Two rounded borders 24 of the bars can hold a guiding tube during the transfer from the stack to the feeding channel in an intermediate position. The rounded borders 24 are adapted to the diameter of a guiding tube. The cross-section of the rounded borders 24 looks like a quadrant.

At a starting position, the distance between the two disks 21 is such that a guiding tube can fall through the gap between the disks 21 so that a guiding tube can arrive at the ground level of the feeding channel. When a guiding tube entered the feeding channel, a subsequent displacement of the disks 21 and the bars 3 reduces the distance between the disks 21 in such a manner that the guiding tube will be pressed or pushed against the motor driven cogwheel 21, since at least the borders of the two disks 21 are wedge-shaped and/or rounded in an appropriate manner.

Adjacent to the end of the bars 3, a further cover 25 can be mounted preferably without the need for tools on the body of the immersion device, in order to protect the guiding tubes against the environment.

Figure 5:
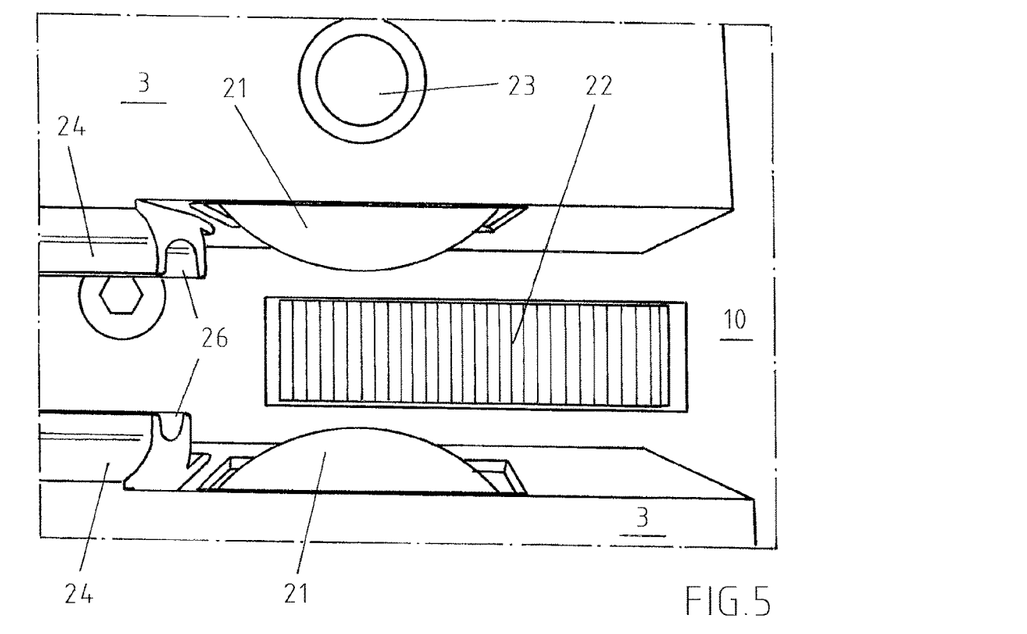
FIG. 5 is a top view of the cogwheel of the feeding channel of the immersion device according to an embodiment of the present invention.

FIG. 5 is a top view of the cogwheel 22 of the feeding channel. The two bars 3 are in the starting position so that a guiding tube may fall on the cogwheel 22, and may thus arrive at the ground level of the feeding channel formed from two semicircle cuts 26 of the two bars 3. The semicircle cuts 26 are situated below the quadrant cuts 24 of the bars 3. The two quadrants 24 form a first compartment for a guiding tube and the two semicircles 26 form a second compartment for a guiding tube namely the feeding channel.

The transfer of a guiding tube from the stack 2 into the feeding channel 26 takes place as follows, when the two bars 3 are in a feeding position. In this feeding position, the distance between the two bars 3 is minimized so that there is no gap or nearly no gap between the two bars 3. When the two bars are in the feeding position, the separations elements 15 rotates from its closed position to its open position so that a guiding tube of the stack can fall through a gap between each pair of separation elements 15, and may thus enter the first compartment formed from the two quadrant like clearances 24. The distance between the ground of the first compartment 24 and the separation elements 15 corresponds with the diameter of one guiding tube. For this reason, only one guiding tube can fall through the separation elements 15. After a first guiding tube is in the first compartment 24, the separation elements 15 rotates back into its closed position so that there is a barrier for the further guiding tubes of the stack. Afterwards, the bars 3 move from the feeding position into the opened position until there is a gap between the two bars 3, which allows the first guiding tube to fall from the first compartment to the ground level of the feeding channel formed by the cuts 26. Afterwards, the bars move back into the feeding position and as a consequence, the two disks 21 push the guiding tube against the cogwheel 22. The first guiding tube is now ready for receiving an optical fiber for carrying out a temperature measurement.

Figure 6:
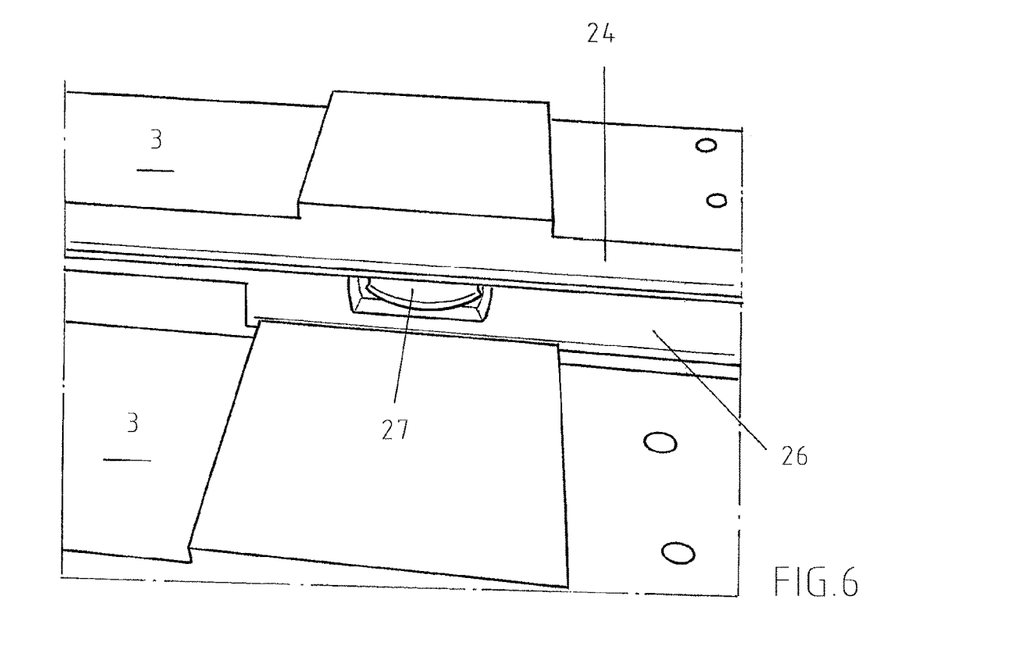
FIG. 6 is a side view of a guiding wheel of the feeding channel of the immersion device according to an embodiment of the present invention.

FIG. 6 shows that each semicircle cut 26 comprises a plurality of wheels 27 which can rotate freely. The rotatable wheels 27 act as guidance for a guiding tube within the feeding channel 26 in order to minimize undesired friction effects. The border of the wheels 27 is rounded in such a manner that the border is adapted to the rounded shape of a guiding tube.

Figure 7:
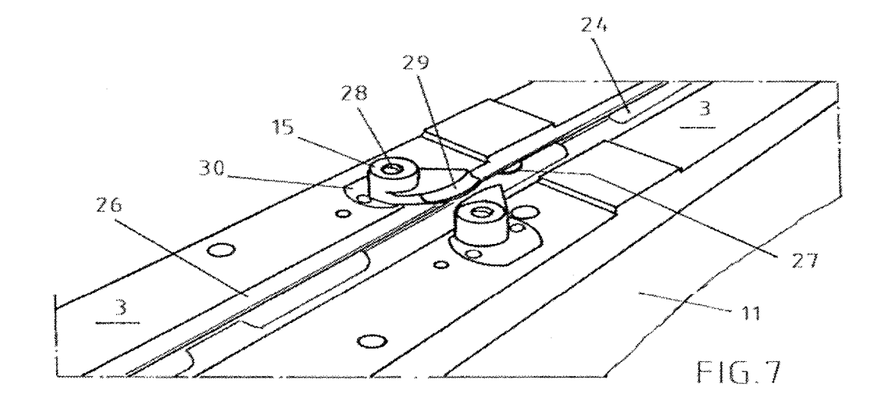
FIG. 7 is a view of separation elements of the transfer mechanism of the immersion device according to an embodiment of the present invention.
Figure 8:
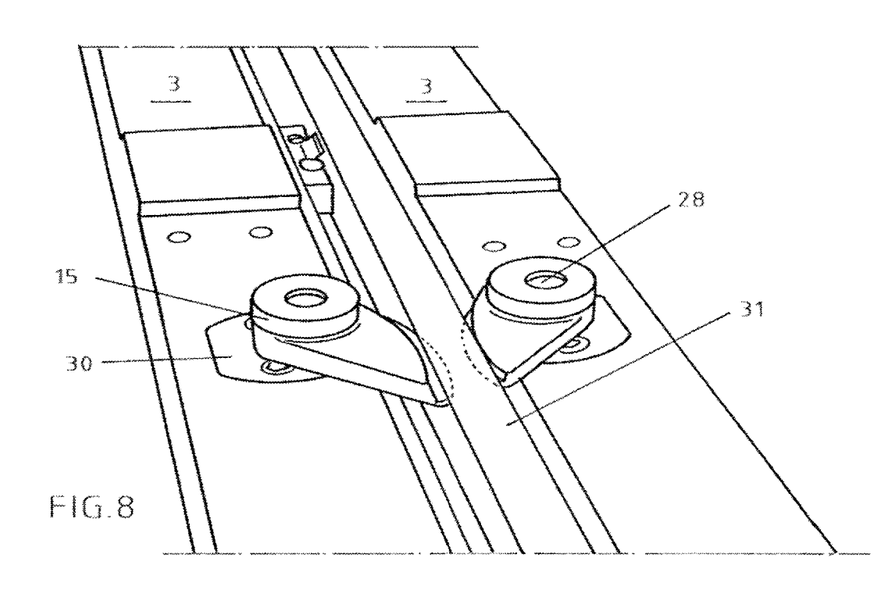
FIG. 8 is a view of separation elements holding a guiding tube of the immersion device according to an embodiment of the present invention.

FIGS. 7 and 8 are views of rotatable separation elements 15 attached to the axis 28. Each separation element 15 comprises a wing having a wedge-shaped or rounded edge 29 which may form a barrier for guiding tubes 31, as shown in FIG. 8. Each axis 28 is attached to the body of the immersion device and is fed through one of the bars 3. Each bar 3 is fixed by protrusions 30 attached at the body of the immersion device. Each protrusion 30 reaches into a corresponding opening of a bar 3 so that there is a frictional connection. As long as the separation elements 15 are attached at the body, it is not possible to remove the bars 3 from the body, specifically from the protrusions 30 of the body. The wings of the separation elements may rotate between a closed position, shown in FIGS. 7 and 8, and an open position. A guiding tube 31 may fall down towards the feeding channel area in the open position.

The stack 2 and the feeding channel area formed by the bars 3 are situated in the middle of the body of the immersion device in order to obtain an equilibrium state.

Figure 9:
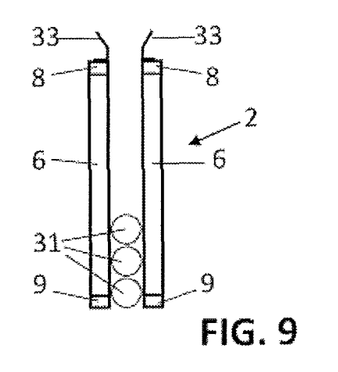
FIG. 9 is a cross-sectional view of the stack of the immersion device according to an embodiment of the present invention.

As shown in FIG. 9, the stack comprises preferably guiding elements 33 on the upper rod 8 forming a V-shaped access into the stack 2. The guiding elements 33 facilitate filling the stack 2 with guiding tubes 31. For stability reasons, at least some of the guiding elements 33 are preferably placed above the rectangular plates 6 as shown in FIGS. 1, 2 and 9.

As a rule, the parts of the immersion device are formed from metal.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An immersion device (1) for disposable guiding tubes (31) comprising:
   a stack (2) for the disposable guiding tubes (31);
   a feeding channel (26) for feeding an optical fiber into at least one of the disposable guiding tubes (31) and for feeding the at least one of the disposable guiding tubes (31) together with optical fiber into a melt; and
   a transfer mechanism for transferring the disposable guiding tubes (31) from the stack (2) into the feeding channel (26) one by one.

2. The immersion device according to claim 1, wherein the transfer mechanism is configured to separate the at least one of the disposable guiding tubes (31) in the feeding channel (26) from the disposable guiding tubes (31) in the stack (2) by a gap.

3. The immersion device according to claim 1, wherein the stack (2) is arranged above the feeding channel (26) so that the at least one of the disposable guiding tubes (31) can fall into the feeding channel (26).

4. The immersion device according to claim 1, wherein at least a lower end wall (4) of the stack (2) forms an acute angle with the feeding channel (26) so that the lower end wall (4) extends in a perpendicular direction or at least in an almost perpendicular direction in a working position of the immersion device.

5. The immersion device according to claim 1, wherein the transfer mechanism comprises at least one relocatable separation element (15) which can be removed from a closed position, in which the at least one separation element (15) can separate the at least one of the disposable guiding tubes (31) in the feeding channel (26) from the disposable guiding tubes (31) in the stack (2), and which can be moved into the closed position.

6. The immersion device according to claim 5, wherein the at least one separation element (15) can be removed from the closed position and can be moved into the closed position by a turning movement whereby each axis (28) of each separation element (15) comprises a non-circular cross section which can be inserted into a corresponding non-circular opening, in order to attach each separation element (15) at a body (10, 11) of the immersion device (1) and/or the at least one separation element (15) is attached to the body (10, 11) of the immersion device (1) by a frictional connection and/or by a form fit connection.

7. The immersion device according to claim 5, wherein a diameter of the feeding channel (26) or of a first compartment (24) and a distance between a ground level of the feeding channel (26) or a ground level of the first compartment (24) and the at least one separation element are such that only one disposable guiding tube can enter the feeding channel (26) or the first compartment (24).

8. The immersion device according to claim 5, wherein the at least one separation element (15) comprises a wedge-shaped edge (29) which can separate a disposable guiding tube (31) of the feeding channel (26) from the disposable guiding tubes (31) of the stack (2).

9. The immersion device according to claim 1, wherein the feeding channel (26) comprises pressing means (21) which can press a disposable guiding tube (31) against one or more motor driven wheels.

10. The immersion device according to claim 9, wherein the pressing means (21) can press a disposable guiding tube (31) against one or more motor driven cogwheels (22).

11. The immersion device according to claim 9, wherein one or more rotatable disks (22) and/or one or more rotatable wheels are the pressing means.

12. The immersion device according to claim 11, wherein the pressing means comprise wedge-shaped or rounded borders.

13. The immersion device according to claim 1, wherein the feeding channel (26) is provided by two bars (3), and wherein at least one of the bars (3) is moveable between a feeding position and a non-feeding position.

14. The immersion device according to claim 13, wherein the bars (3) are attached to a body (10, 11) by a frictional connection and/or by a form closure.

15. The immersion device according to claim 14, wherein the body (10, 11) covers electrical equipment of the immersion device and/or in part one or more motor driven wheels and/or one or more motors.

16. The immersion device according to claim 14, wherein the body is composed of at least two housings (10, 11), and wherein the at least two housings are connected by a form closure comprising a hook connection.

17. The immersion device according to claim 16, wherein the stack (2) is attached to the body by a form closure.

* * * * *